US012567758B2

(12) United States Patent
Cai et al.

(10) Patent No.: US 12,567,758 B2
(45) Date of Patent: **\*Mar. 3, 2026**

(54) CHARGING SYSTEM AND EMERGENCY START DEVICE

(71) Applicant: SHENZHEN KALAIFU TECHNOLOGY CO., LTD., Shenzhen (CN)

(72) Inventors: Lian Cai, Shenzhen (CN); Tao Cai, Shenzhen (CN)

(73) Assignee: SHENZHEN KALAIFU TECHNOLOGY CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 19/262,453

(22) Filed: Jul. 8, 2025

(65) Prior Publication Data

US 2025/0373053 A1 Dec. 4, 2025

Related U.S. Application Data

(63) Continuation of application No. 18/969,382, filed on Dec. 5, 2024, now Pat. No. 12,388,283.

(30) Foreign Application Priority Data

May 31, 2024 (CN) .......................... 202410706022.3
May 31, 2024 (CN) .......................... 202421249368.7

(51) Int. Cl.
H02J 7/00 (2006.01)
H02J 7/64 (2026.01)
(Continued)

(52) U.S. Cl.
CPC ................ H02J 7/933 (2026.01); H02J 7/64 (2026.01); H02J 9/04 (2013.01)

(58) Field of Classification Search
USPC ......................................................... 320/137
See application file for complete search history.

(56) References Cited

U.S. PATENT DOCUMENTS 5,804,944 A * 9/1998 Alberkrack ........... H02J 7/0048
324/433
6,791,298 B2 9/2004 Shenai et al.
(Continued)

FOREIGN PATENT DOCUMENTS

CN 116526618 B 5/2024

OTHER PUBLICATIONS

European Search Report issued in counterpart European Patent Application No. EP 25179908.6, dated Oct. 17, 2025.

*Primary Examiner* — Samuel Berhanu
(74) *Attorney, Agent, or Firm* — Westbridge IP LLC

(57) ABSTRACT

A charging system includes a charging input interface, an inductor, a first switch, a second switch, a first voltage acquisition circuit, and a control circuit. The charging input interface is connected to the inductor, which is connected to the first switch and the second switch. The second switch is configured for electrical connection with an energy storage power supply. The first voltage acquisition circuit is connected to the second switch and configured to detect the first voltage output by the charging system in real time. The control circuit cyclically controls the switch on/off time of the first switch based on the first voltage. During the charging process of the charging system, when the first voltage is less than the first preset voltage value, the control circuit controls the first switch to conduct and starts cyclic control. The state of the first switch is opposite to that of the second switch.

20 Claims, 5 Drawing Sheets

(51) Int. Cl.
_H02J 7/90_ (2026.01)
_H02J 9/04_ (2006.01)

(56) References Cited

U.S. PATENT DOCUMENTS

| | | | |
|---|---|---|---|
| 2012/0133340 A1* | 5/2012 | Masumoto | H02J 7/00 |
| | | | 320/164 |
| 2015/0069958 A1* | 3/2015 | Yang | H02J 7/007 |
| | | | 320/137 |
| 2017/0274777 A1 | 9/2017 | Alam et al. | |
| 2022/0115890 A1* | 4/2022 | Namikawa | H01M 10/0525 |
| 2024/0039409 A1 | 2/2024 | Gataric | |

* cited by examiner

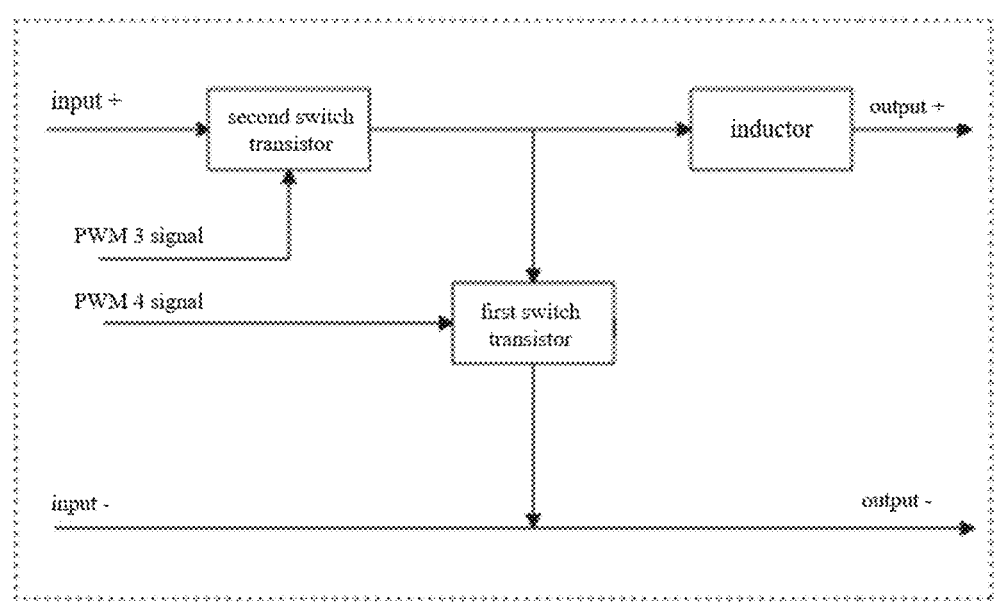
FIG. 5(b)
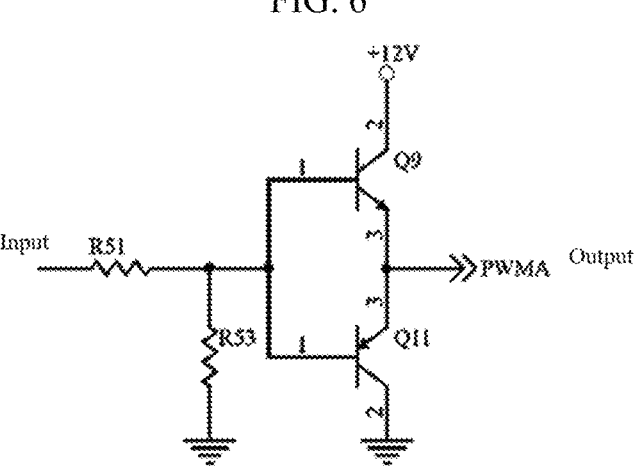
FIG. 6
FIG. 7

CHARGING SYSTEM AND EMERGENCY START DEVICE

CROSS-REFERENCE TO RELATED APPLICATIONS

The present application is a continuation of U.S. patent application Ser. No. 18/969,382, filed on Dec. 5, 2024, which claims priority to Chinese Patent Application No. 202421249368.7, filed with the Chinese Patent Office on May 31, 2024 and to Chinese Patent Application No. 202410706022.3, filed with the Chinese Patent Office on May 31, 2024. All of the aforementioned applications are incorporated herein by reference in their entireties.

TECHNICAL FIELD

The present disclosure relates to the technical field of electronic circuits, and particularly to a charging system and an emergency start device.

BACKGROUND

Existing charging systems of automotive emergency start power supplies generally use dedicated charging management chips. The charging systems require the used charger to match the internal charging circuit parameters of the automotive emergency start power supplies. For example, if the designed charging circuit parameters are 5V, 2 A and 10 W, then the user needs to use a 5V and 2 A or higher charger to operate.

However, when there is a deviation between the charger and the designed charging specifications, for example, if the charger power is less than the designed charging power, the insufficient charger power will trigger protection, resulting in an inability to charge normally and even possibly damaging the charger. For another example, if the charger power is greater than the designed charging power, the inability to maximize the utilization of the charger power leads to low charging efficiency and longer charging time.

SUMMARY

In view of this, the embodiments of the present disclosure provide a charging system and an emergency start device that can achieve stable output based on the power of the internal charging circuit of the automotive emergency start power supply, thereby maximizing charging efficiency.

In a first aspect, the embodiments of the present disclosure provide a charging system, configured for charging an energy storage power supply. The charging system includes a charging input interface, an inductor, a first switch, a second switch, a first voltage acquisition circuit, and a control circuit, wherein the charging input interface is electrically connected to a first end of the inductor,
    a second end of the inductor is electrically connected to a first end of the first switch and a first end of the second switch respectively,
    and the second end of the first switch is electrically connected to a ground terminal, and the second end of the second switch is configured for an electrical connection with the energy storage power supply.
    The first voltage acquisition circuit is electrically connected to the second end of the second switch, configured to detect a first voltage output by the charging system in real time.

The control circuit is electrically connected to the first voltage acquisition circuit and a control terminal of the first switch respectively, and the control circuit cyclically controls a switch on/off time of the first switch based on the first voltage.

During a charging process of the charging system, when the first voltage is less than a first preset voltage value, the control circuit controls the first switch to conduct and starts cyclic control; when the first switch is in a conducting state, the second switch is in a cutoff state; and when the first switch is in a cutoff state, the second switch is in a conducting state.

In a second aspect, the embodiments of the present disclosure provide an emergency start device, including a built-in energy storage power supply and the charging system. A second end of the second switch is electrically connected to the built-in energy storage power supply.

The embodiments of the present disclosure have the following beneficial effects.

The charging system of the embodiments of the present disclosure includes a charging input interface, an inductor, a first switch, a second switch, a first voltage acquisition circuit, and a control circuit. The charging input interface is electrically connected to the inductor, and the inductor is also respectively connected to the first switch and the second switch. The second switch is configured for an electrical connection with the energy storage power supply. The first voltage acquisition circuit is electrically connected to the second switch and is configured to detect the first voltage output by the charging system in real time. The control circuit cyclically controls the switch on/off time of the first switch based on the first voltage. During the charging process of the charging system, when the first voltage is less than the first preset voltage value, the control circuit controls the first switch to conduct and starts cyclic control. When the first switch is in a conducting state, the second switch is in a cutoff state; and when the first switch is in a cutoff state, the second switch is in a conducting state. When the first voltage output by the charging system is less than a first preset voltage value, the control circuit of the charging system can control the first switch to conduct to regulate the output of the charging system, thereby stabilizing the output.

BRIEF DESCRIPTION OF THE DRAWINGS

To more clearly illustrate the technical solutions of the embodiments of the present disclosure, the following will briefly introduce the drawings used in the embodiments. It should be understood that the following drawings only show some embodiments of the present disclosure, and therefore they should not be regarded as a limitation on the scope. Those ordinary skilled in the art can also obtain other related drawings based on these drawings without inventive effort.

FIG. 6 illustrates a schematic diagram of a structure of a synchronous/asynchronous buck-boost unit of the charging system according to the embodiments of the present disclosure.

FIG. 7 illustrates a schematic diagram of a structure of a second control circuit based on a driver circuit consisted of discrete totem-pole circuit of the charging system according to the embodiments of the present disclosure.

DETAILED DESCRIPTION OF THE EMBODIMENTS

Figure 1:
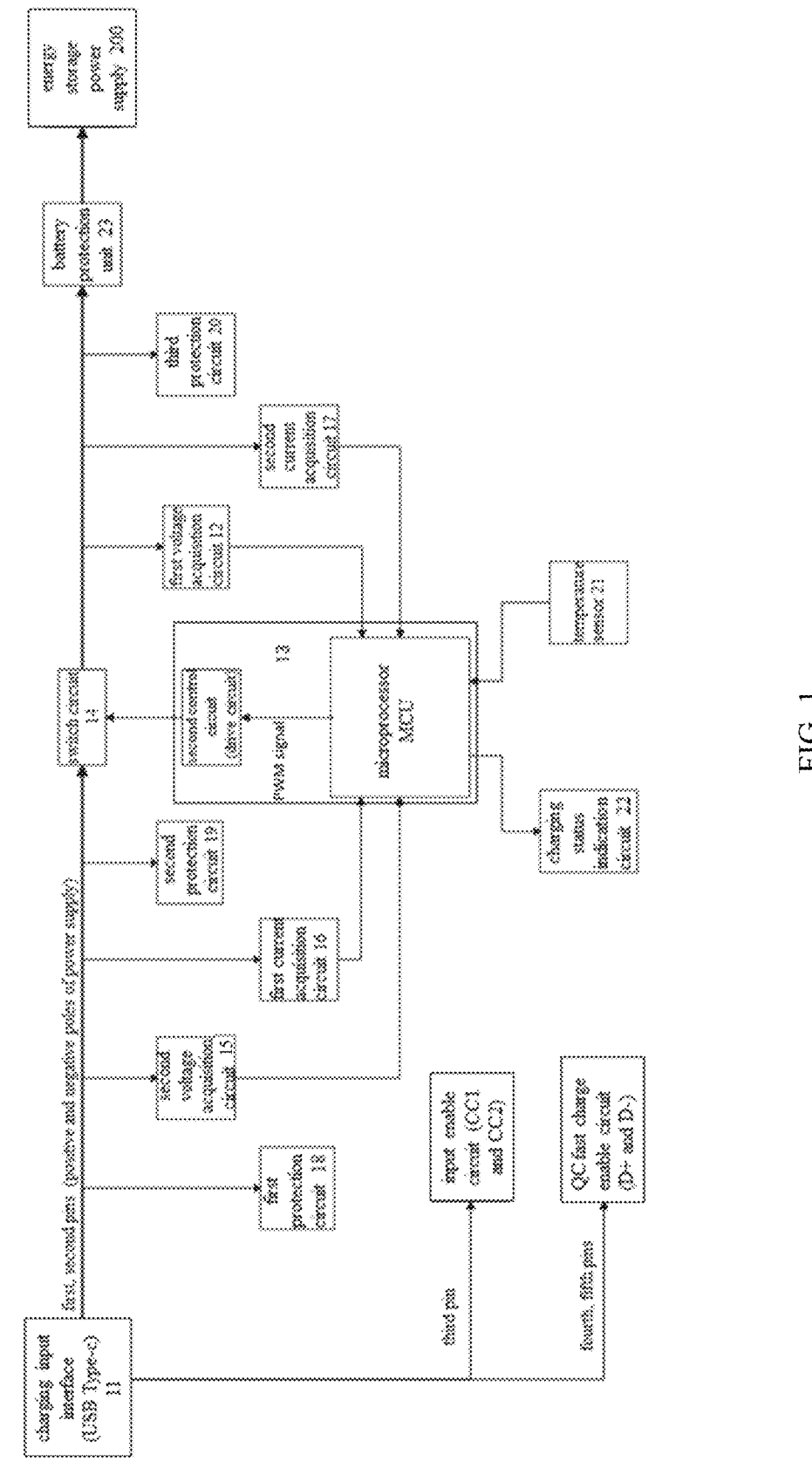
FIG. 1 illustrates a schematic diagram of a structure of a charging system according to the embodiments of the present disclosure.

The technical solutions in the embodiments of the present disclosure will be clearly and completely described below in conjunction with the drawings in the embodiments of the present disclosure. Obviously, the described embodiments are only a part of the embodiments of the present disclosure, and not all of the embodiments.

The components of embodiments of the present disclosure which are generally described and illustrated in the drawings herein can be arranged and designed in a variety of different configurations. Accordingly, the following detailed description of the embodiments of the present disclosure provided in the drawings is not intended to limit the scope of the present disclosure for which protection is claimed, but merely represents selected embodiments of the present disclosure. Based on the embodiments in the present disclosure, all other embodiments obtained of those of skill in the art of without making inventive efforts are within the scope of protection of the present disclosure.

In the following text, the terms "comprise", "include", and their derivatives, as used in the various embodiments of the present disclosure, are intended to indicate the presence of specific features, numbers, steps, operations, elements, components, or combinations thereof, and should not be construed as excluding the possibility of the existence of one or more other features, numbers, steps, operations, elements, components, or combinations thereof, or the possibility of adding one or more features, numbers, steps, operations, elements, components, or combinations thereof. In addition, the terms "first", "second", and "third" are only used to distinguish the descriptive and are not to be construed as indicating or implying relative importance.

Unless otherwise defined, all terms used herein (including technical terms and scientific terms) have the same meaning as commonly understood by those of ordinary skill in the art to which the various embodiments of the present disclosure belong. The terms (such as those defined in commonly used dictionaries) should be interpreted as having the same contextual meaning in the relevant technical field and should not be interpreted in an idealized or overly formal sense unless clearly defined in the various embodiments of the present disclosure.

Some embodiments of the present disclosure are described in detail below, in conjunction with the drawings. The following embodiments and features in the embodiments can be in conjunction with each other in a non-conflicting manner.

FIG. 1 illustrates a schematic diagram of a structure of a charging system 100 according to the embodiments of the present disclosure.

Exemplarily, the charging system 100 is configured to charge the energy storage power supply 200 and mainly comprises a charging input interface 11, a switch circuit 14, a first voltage acquisition circuit 12, and a control circuit 13, among others. The switch circuit 14 includes an inductor, a first switch, and a second switch. Specifically, the charging input interface 11 is electrically connected to the first end of the inductor, the second end of the inductor is electrically connected to the first end of the first switch and the first end of the second switch, the second end of the first switch is electrically connected to the ground terminal, and the second end of the second switch is configured for electrical connection with the energy storage power supply 200. The first voltage acquisition circuit 12 is electrically connected to the second end of the second switch, which is configured to detect a first voltage output by the charging system 100 in real time. The control circuit 13 is electrically connected to the first voltage acquisition circuit 12 and the control terminal of the first switch. For example, the energy storage power supply 200 mentioned above can, but is not limited to, be a vehicle emergency start power supply.

In the embodiment, the charging input interface 11 is a universal serial bus connector configured for connecting an external charger to charge the energy storage power supply 200. Exemplarily, the charging input interface 11 includes a first pin, a second pin, and a third pin, wherein the first pin is a positive terminal configured for connecting the positive terminal of the power supply VCC, the second pin is a negative terminal configured for connecting the negative terminal of the power supply or the ground terminal GND, and the third pin is a signal terminal. The third pin is configured for communication with an external charger; for example, the third pin can enable the fast-charging function of the external charger, thus allowing the external charger to output different voltages to the charging system 100, ranging from 3.3V to 28V, specifically 5V, 9V, 12V, 15V, 20V, 28V, etc. It is understood that a first preset voltage value can be determined based on the voltage required by the energy storage power supply 200. For instance, if the energy storage power supply 200 consists of four batteries connected in series, the first preset voltage value can be set to 16.8V, etc.

It is understood that the structural design of the charging input interface 11 depends on the type of interface configured to connect to the external charger. For example, different types of interfaces such as Universal Serial Bus (USB) 2.0/3.0, USB Type-A/B/C, Lightning, etc., can be used. Using a USB Type-C connector as an example, the charging input interface 11 can be configured to connect to a common USB charger (i.e., one that does not support fast charging protocols) or to a USB charger that supports Quick Charge (QC) fast charging protocols.

Further optionally, for the first pin and the second pin, to increase the overcurrent capability, the charging input interface 11 can be provided with multiple pins used in parallel in its hardware structure. Sometimes, for the third pin, to ensure that the charging input interface 11 can be plugged in both positive and negative sides properly (e.g., using USB Type-C), optionally, the third pin can be designed as two pins in the hardware structure, as shown by the CC1 and CC2 pins in FIG. 2, and then the output of the external charger is enabled by means of external resistors or external protocol chips.

Figure 2:
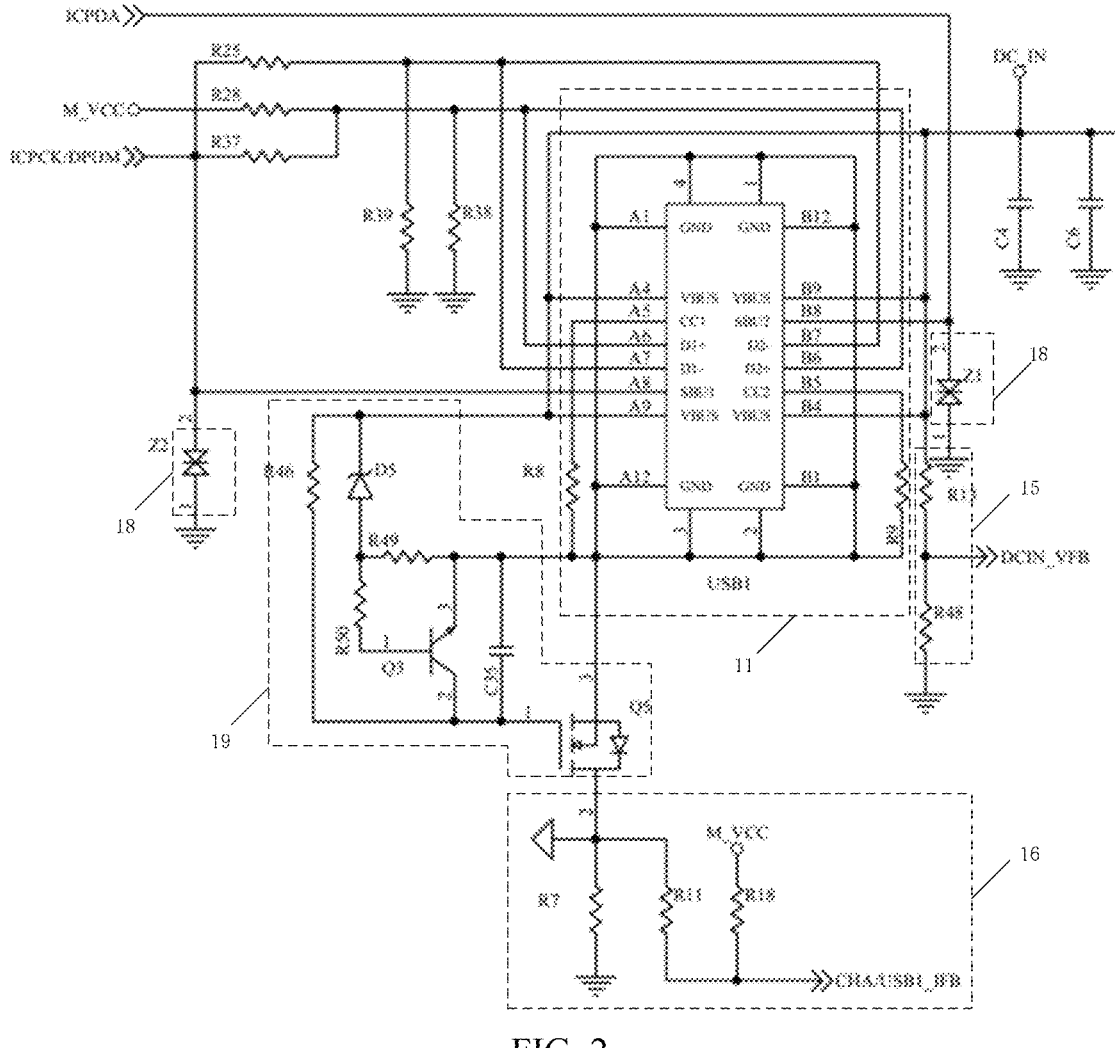
FIG. 2 illustrates a schematic diagram of another structure of a charging system according to the embodiments of the present disclosure.

Using external resistors as an example, as shown in FIG. 2, in one embodiment, the charging system 100 includes a first resistor (i.e., R8 and R9 in FIG. 2), wherein one end of the first resistor is electrically connected to the third pin, and the other end of the first resistor is electrically connected to the second pin. For example, an external charger typically outputs a rated voltage, such as 5V. If a Power Delivery (PD) charger is connected, the PD charger outputs a 5V voltage to the charging system 100 with the cooperation of the external resistors on CC1 and CC2. At this time, the control circuit 13 outputs a corresponding control signal, such as a Pulse Width Modulation (PWM) control signal with a minimum duty cycle (e.g., 5%). Moreover, by controlling the conduction of the first switch, the charging system 100 outputs a voltage value (i.e., the aforementioned first voltage).

As an example of an external protocol chip, in another embodiment, the charging system 100 includes a protocol chip, wherein the protocol chip is electrically connected to the third pin. Furthermore, the protocol chip is also configured to control the voltage value between the first pin and the second pin to be between 3.3V and 28V. Regarding the model or form of the protocol chip, there is no limitation here.

For example, in a feasible embodiment, the protocol chip can be a microprocessor. Considering that the control circuit 13 in the charging system 100 can also include a microprocessor (MCU), a single microprocessor MCU can be shared to reduce costs. Therefore, the aforementioned third pin can be electrically connected to the control circuit 13, which is configured to receive control signals from the control circuit 13 so as to enable the external PD charger to output voltage to the charging system 100.

As an optional solution, if a USB charger that supports fast charging protocols is connected, the charging input interface 11 also includes a fourth pin and a fifth pin, corresponding to the D+ and D-signal pins in the USB Type-C interface (as shown in FIG. 2). These pins are connected to two pins of the control circuit 13 (i.e., signal ICPCK D+ and ICPCK D−) to enable communication between the control circuit 13 and the fast-charging charger, thus enabling fast charging voltage output, e.g., fast charging protocols such as QC2.0 and QC3.0 from Qualcomm.

Figure 3:
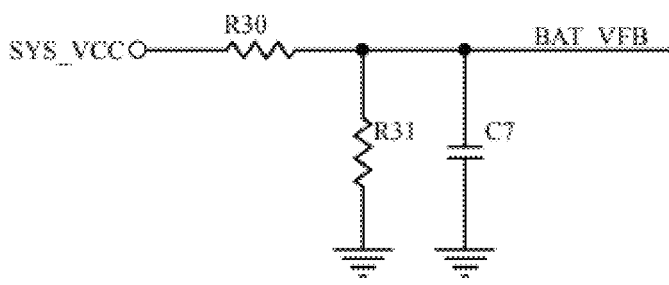
FIG. 3 illustrates a schematic diagram of a structure of a first voltage acquisition circuit of the charging system according to the embodiments of the present disclosure.

In the embodiment, the first voltage acquisition circuit 12 is coupled to the output end of the charging system 100 to collect the output voltage of the charging system 100 (i.e., the aforementioned first voltage). When the charging system 100 is connected to an external charger and starts to work, the control circuit 13 outputs a corresponding control signal to control the conduction of the first switch, so that the charging system 100 outputs a voltage value. At this time, the first voltage acquisition circuit 12 can collect the corresponding first voltage. For example, in one embodiment, as shown in FIG. 3, the first voltage acquisition circuit 12 includes sampling resistors R30, R31, and capacitor C7. One end of sampling resistor R30 is configured to connect to the output end of the charging system 100 (i.e., SYS_VCC in FIG. 3), and one end of capacitor C7 is configured to connect to a signal pin of the control circuit 13 (i.e., BAT_VFB in FIG. 3).

In the embodiment, the control circuit 13 can be configured to cycle control the switch on/off time of the first switch based on the first voltage. Exemplarily, during the charging process of the charging system 100, when the first voltage is less than the first preset voltage value, the control circuit 13 controls the first switch to conduct and starts the cycle control. Optionally, if the second switch is a directly controllable device, then the control circuit 13 needs to ensure that while the first switch is conducting, the second switch is off. Upon entering cycle control, the control circuit 13 synchronously controls the states of the first switch and the second switch. The states of the first switch and the second switch are opposite. In other words, when the first switch is in a conducting state, the second switch is in a cutoff state; and when the first switch is in a cutoff state, the second switch is in a conducting state. It is understood that the first switch and the second switch are jointly configured to achieve synchronous or asynchronous boost voltage conversion, with the second switch mainly serving as a follow current device. It should be noted that the aforementioned control of the first switch can be based not only on the first voltage but also on other parameters such as voltage and current.

Figure 4:
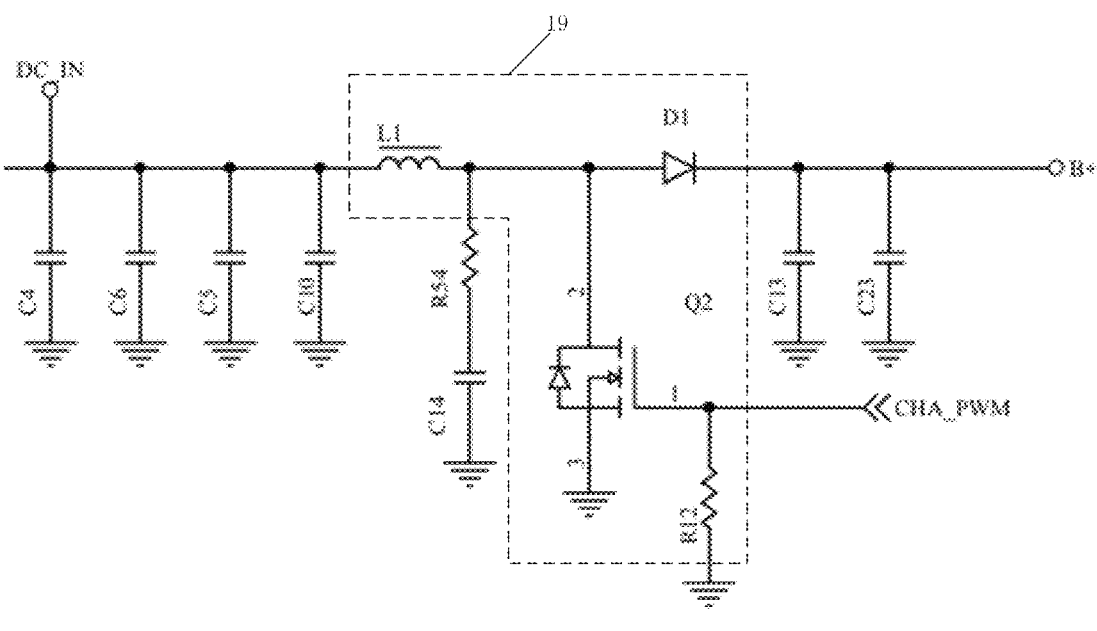
FIG. 4 illustrates a schematic diagram of a structure of a switch circuit of the charging system according to the embodiments of the present disclosure.

In the embodiment, the first switch can be a Metal Oxide Semiconductor (MOS) transistor or similar device. For example, as shown in FIG. 4, the switch circuit 14 includes an inductor L1, a diode D1 (i.e., the second switch), a MOS transistor Q2 (i.e., the first switch), and a resistor R12. Among others, wherein the first end of the first switch Q2 is the drain of the MOS transistor, the second end is the source of the MOS transistor, and the third end, which is connected to the control circuit 13, is the gate of the MOS transistor. It is understood that the connection method shown in FIG. 4 is just one feasible example of the switch circuit 14 and is not the limitation. Specifically, adaptive adjustments can be made based on the MOS transistor model and positional relationships.

Based on the fact that the first switch is an MOS transistor, in one embodiment, the control signal configured for controlling the first switch can be a PWM (Pulse Width Modulation) control signal. Specifically, when the control circuit 13 detects that the first voltage is less than the first preset voltage value, the control circuit 13 outputs a PWM control signal to increase the switch on time of the switch circuit 14 within one cycle, thereby increasing the output voltage of the charging system to reach the first preset voltage value, which is the constant voltage required by the energy storage power supply 200. Conversely, when it is detected that the first voltage is greater than the first preset voltage value, the control circuit 13 outputs a PWM control signal to reduce the switch on time of the first switch within one cycle, meaning that the output voltage of the charging system is reduced to bring it back to the first preset voltage value. It is understood that the first preset voltage value is usually related to the charging cut-off voltage of the energy storage power supply 200, which can be set to 12.6-16.8V, for example.

Figure 5A:
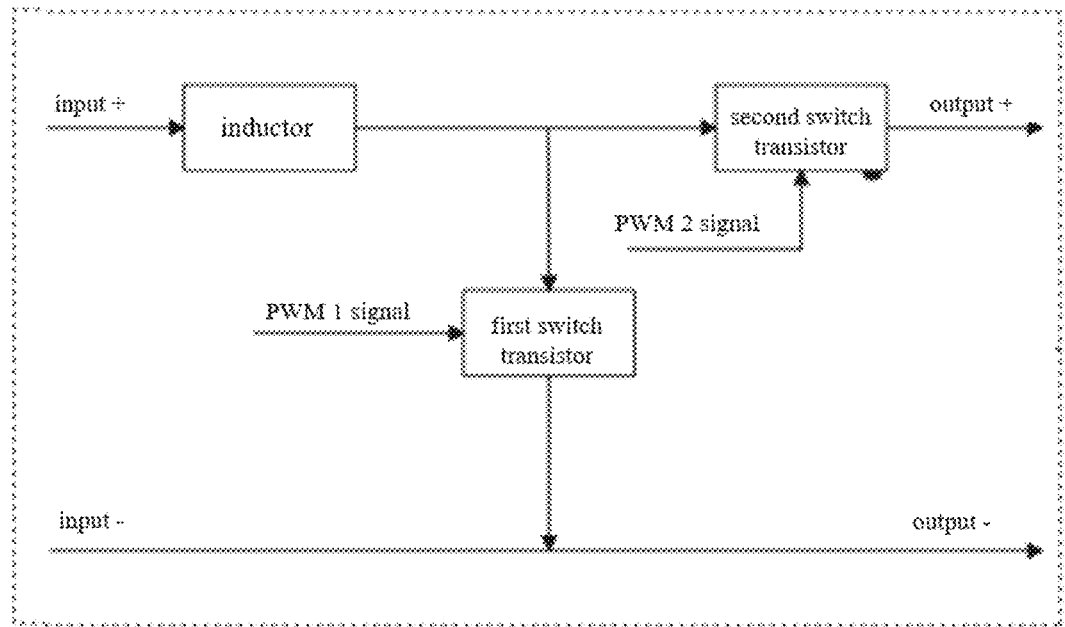
FIG. 5(*a*) and FIG. 5(*b*) respectively illustrate schematic diagrams of structures of a boost unit and a buck unit of the charging system according to the embodiments of the present disclosure.

It is noteworthy that the switch circuit 14 formed by the aforementioned first switch and second switch can form a boost conversion unit or a buck conversion unit. For example, in a boosting scenario, as shown in FIG. 5(*a*), the first end of the inductor is connected to the input end of the charging system 100, and the two switches are arranged near the output end of the charging system 100 and both are connected to the second end of the inductor. In a voltage-reducing scenario, as shown in FIG. 5(*b*), the two switches are arranged near the input end of the charging system 100 and both are connected to the first end of the inductor, with the second end of the inductor connected to the output end of the charging system 100.

The aforementioned second switch can be a diode or a MOS transistor, etc. Using a diode as an example, as shown in FIG. 4, the first end of the second switch (i.e., D1 in FIG. 4) is the anode of the diode, and the second end of the second switch (D1) is the cathode of the diode. Using a MOS transistor as another example, the control terminal of the second switch (D1) is connected to the control circuit 13. The first end of the second switch (D1) can be the drain, and the second end can be the source. The connection relationship between the drain and the source can be adaptively adjusted according to actual needs.

It is understood that if the second switch is a diode, then the first switch and the second switch will be controlled in asynchronous mode. This is because a diode conducts in only one direction. In this case, the control circuit 13 only needs to control the first switch, and correspondingly, the diode will adaptively conduct or cut off according to the direction of the current flowing through it, making its conducting/cutoff state opposite to that of the first switch. If the second switch is a MOS transistor, then the first switch and the second switch are controlled in synchronous mode, where the control circuit 13 outputs two completely complementary PWM control signals to control the first switch and the second switch, respectively.

As an optional solution, considering that the charging system 100 can also be applied to functions that sometimes require boosting and sometimes require voltage reduction, in one embodiment, the charging system 100 further comprises a third switch and a fourth switch. As shown in FIG. 6, a first end of the third switch is electrically connected to the charging input interface 11, a second end of the third switch is electrically connected to a first end of the inductor and a first end of the fourth switch respectively, a second end of the fourth switch is electrically connected to the ground terminal, and a control terminal of the third switch is electrically connected to the control circuit 13. The control circuit 13 is configured to cyclically control a switch on/off time of the third switch based on the first voltage.

During the startup process of the charging system 100, the four switches are correspondingly controlled mainly based on the magnitude of the input voltage of the charging system 100 and the first preset voltage value. For example, if it is detected that the input voltage of the charging system 100 is greater than the first preset voltage value, the charging system 100 will operate in voltage-reducing mode, at which time the third switch and the fourth switch are controlled to operate by the PWM signal output from the control circuit 13. Conversely, if the input voltage is detected to be lower than the first preset voltage value, the charging system 100 will operate in boosting mode. At this time, the third switch is in the conducting state, the fourth switch is in the cutoff state, and the first switch and the second switch are controlled to operate by the PWM signal output from the control circuit 13. Once the charging system 100 completes its startup, it enters the process of charging the energy storage power supply. The third switch and the fourth switch are in opposite states, which means that, when the third switch is in the conducting state, the fourth switch is in the cutoff state, and when the third switch is in the cutoff state, the fourth switch is in the conducting state.

During the charging process of the charging system, in one embodiment, when the charging system 100 detects that the first voltage is less than the first preset voltage value, the control circuit 13 enables the third switch to be in the conducting state and the fourth switch to be in the cutoff state. Conversely, when the charging system 100 detects that the first voltage is greater than the first preset voltage value, the first switch is in the cutoff state, and the control circuit 13 controls the third switch to cutoff and starts cyclic control. It can be understood that by detecting that the output voltage is greater than the set value, meaning that the output voltage is too high, the control circuit 13 will control the third switch to switch from the previous conducting state to the cutoff state, thereby reducing the output power. Additionally, if the fourth switch is a MOS transistor, then the states of third switch and the fourth switch are synchronously controlled.

In another embodiment, exemplarily, during the charging process of the charging system 100, the four switches can be correspondingly controlled based on the magnitude of the input voltage and output voltage of the charging system 100. For example, when it is detected that the input voltage of the charging system 100 is greater than the output voltage (i.e., the first voltage), the first switch is in the cutoff state, and the second switch is in the conducting state, meaning that the boosting part goes into an inoperative state (i.e., no boosting). Simultaneously, the control circuit 13 cyclically controls the conduction and cutoff of the third switch and the fourth switch based on the relationship between the first voltage and the first preset voltage value to maintain the first voltage equal to the first preset voltage value. Conversely, when the charging system 100 detects that the input voltage is less than the output voltage, the third switch is in the conducting state, and the fourth switch is in the cutoff state, meaning that the voltage-reducing part goes into an inoperative state (i.e., no voltage reduction). Simultaneously, the control circuit 13 cyclically controls the conduction and cutoff of the first switch and the second switch.

Furthermore, based on the structure of the third switch being a MOS transistor, in one embodiment, the control signal used to control the third switch can be a PWM control signal, etc. Similar to the first switch and the second switch mentioned above, in one embodiment, the third switch can be a MOS transistor, and the fourth switch can be a diode or MOS transistor. When the fourth switch is a diode, the first end of the fourth switch is the cathode of the diode, and the second end of the fourth switch is the anode of the diode. Similarly, if the fourth switch is a diode, the third switch and the fourth switch will be controlled in asynchronous mode. It can be understood that the diode has a characteristic of unidirectional conduction, so the control circuit 13 only needs to control the third switch. Correspondingly, the diode will adaptively conduct or cut off according to the direction of the current flowing through it, making its conducting/cutoff state opposite to that of the third switch. If the fourth switch is a MOS transistor, then the third switch and the fourth switch are controlled in synchronous mode, where the control circuit 13 outputs two completely complementary PWM control signals to control the third switch and the fourth switch, respectively.

It can be understood that the switch circuit 14 in FIG. 1 can be described as the aforementioned boost conversion unit, buck conversion unit, or buck-boost conversion unit, and each unit includes asynchronous mode and synchronous mode. In other words, the switch circuit 14 can be a synchronous boost unit, asynchronous boost unit, synchronous buck unit, and asynchronous buck unit.

Optionally, the charging system 100 further includes a first capacitor, wherein one end of the first capacitor is electrically connected to the second end of the second switch, and the other end of the first capacitor is electrically connected to the ground terminal. It can be understood that the first capacitor, as an output capacitor, is arranged at the output end of the charging system 100, which can be configured to store electrical energy and also has a filtering function. The number of the first capacitor is only an example here, and it can be set according to actual needs, without limitation. For example, as shown in FIG. 4, the first capacitor includes C13 and C23. Furthermore, before the switch circuit 14, a second capacitor can be provided as the input capacitor of the charging system 100, such as the capacitors C4, C5, C6, and C10 shown in FIG. 4.

In the embodiment, the control circuit 13 is configured to cyclically control the conduction and cutoff of the first switch. For example, the control circuit 13 can be achieved by using a control chip with the ability to drive the MOS transistor, or it can be achieved by using a control chip and a drive circuit separately. In one implementation, the control circuit 13 includes a first control circuit and a second control circuit. The first control circuit is electrically connected to the first voltage acquisition circuit 12, and the second control circuit is electrically connected to the first control circuit and the control terminal of the first switch, respectively. The first control circuit generates a first control signal based on the first voltage and sends the first control signal to the second control circuit so that the second control circuit cyclically controls the switch on/off time of the first switch based on the first control signal. For example, as shown in FIG. 1, the first control circuit can be a microprocessor, and the second control circuit can be a drive circuit, which is configured to increase the voltage and current intensity of the drive signal (such as a PWM signal), that is, to increase the drive capability. For example, the second control circuit outputs a PWM control signal to the first switch to control the switch on time of the first switch.

Regarding the second control circuit, for example, in one embodiment, it can be composed of discrete components, such as using a totem-pole drive circuit. As shown in FIG. 7, the second control circuit includes resistors R51, R53, and common-emitter transistors Q9 and Q11. The first end of resistor R51 is configured to input a signal (i.e., the first control signal) from the microprocessor MCU, and a PWM signal that has driven the first switch is output through the above common-emitter.

Figure 8:
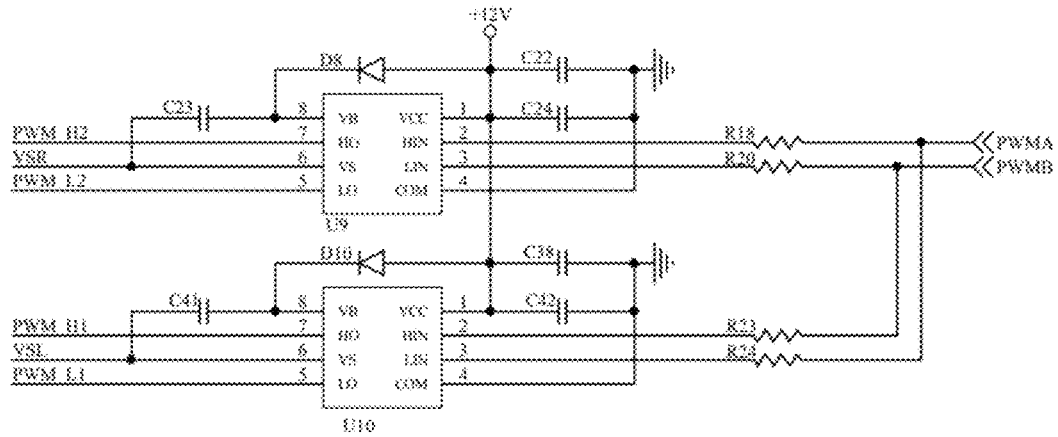
FIG. 8 illustrates a schematic diagram of a structure of a second control circuit based on an integrated circuit of the charging system according to the embodiments of the present disclosure.

Of course, in some other embodiments, the second control circuit can also be realized using an integrated circuit. As shown in FIG. 8, for driving the first switch, the second control circuit can use the integrated chip U9 and the peripheral circuit composed of capacitors C22, C23, C24, diode D8, and resistors R18, R20, etc., to achieve the driving function and connect to the control circuit 13 via the pin PWMA. Optionally, if the second switch also uses a MOS transistor, the second control circuit can further include the integrated chip U10 and the corresponding peripheral circuit composed of capacitors C38, C41, C42, diode D10, and resistors R23, R24, etc., and connect to the control circuit 13 via the pin PWMB.

It can be understood that the control circuit 13 in the embodiment refers to programs, circuits, systems, and subsystems, whether they are implemented in hardware, tangibly in software, or both, and whether they are programmable or not. The term "control circuit" used here includes, but is not limited to, one or more computing devices, hard-wired circuits, signal modification devices and systems, control systems, microprocessors, programmable devices and systems, field-programmable gate arrays, application-specific integrated circuits, system-on-chip, systems including discrete components and/or circuits, state machines, and any combination of the foregoing devices and machines.

Furthermore, in some other embodiments, as shown in FIG. 1, the charging system 100 further includes a first current acquisition circuit 16. The first current acquisition circuit 16 is electrically connected to the control circuit 13 and the charging input interface 11, respectively, which is configured for detecting the first current input by the charging input interface 11 (i.e., the input current of the charging system 100). The control circuit 13 cyclically controls the switch on/off time of the first switch based on the first voltage and/or the first current. In other words, the control circuit 13 can also use one or a combination of the output voltage and the input current of the charging system 100 to control the first switch, thereby controlling the charging system 100 to achieve constant current or constant voltage charging. For example, as shown in FIG. 2, when the charging input interface 11 uses a USB Type-C interface, the first current acquisition circuit 16 includes resistors R7, R11, and R18, wherein one end of resistor R18 (i.e., pin USB_IFB) is configured to connect to the microcontroller MCU in the control circuit 13.

In one embodiment, when the control circuit 13 detects that the first voltage is lower than the first preset voltage value and the first current is lower than the first preset current value, the control circuit 13 increases the output PWM control signal to control the first switch to increase the switch on time within one cycle. It can be understood that when the PWM control signal is increased, the output voltage or input current of the charging system 100 will increase. Similar to the aforementioned first preset voltage value, the first preset current value is related to the charging current of the energy storage power supply 200, and it can be set according to actual needs without specific limitations here. For example, for the energy storage power supply 200, if its charging current is 2 A, then the first preset current value is usually set to 2 A.

Of course, in some scenarios with strict limitations on output voltage or input current, in one embodiment, if it is detected that the first voltage is greater than the first preset voltage value, or the first current is greater than the first preset current value, that is, one of the cases where the output voltage is too high or the input current is too high occurs, the control circuit 13 will reduce the output PWM control signal, such as reducing the duty cycle by 10-15%. Optionally, when it is detected that the first voltage is greater than the first preset voltage value and the first current is greater than the first preset current value, that is, when both conditions are met, the control circuit 13 controls the first switch to reduce the switch on time within one cycle by adjusting the PWM control signal, that is, reduces the output voltage or input current to ensure constant current and constant voltage charging.

In some other embodiments, as shown in FIG. 1, the charging system 100 further includes a second voltage acquisition circuit 15. The second voltage acquisition circuit 15 is electrically connected to the control circuit 13 and the charging input interface 11, respectively, which is configured for detecting the second voltage input by the charging input interface 11 (i.e., the input voltage of the charging system 100). The control circuit 13 cyclically controls the switch on/off time of the first switch based on the first voltage and/or the second voltage. In other words, the control circuit 13 can also use one or a combination of the input voltage and the output voltage of the charging system 100 to control the first switch, thereby controlling the output of the charging system 100.

For example, as shown in FIG. 2, when the charging input interface 11 uses a USB Type-C interface, the second voltage acquisition circuit 15 includes resistors R13 and R48, wherein the middle node of resistors R13 and R48 (i.e., pin DCIN_VFB) is configured to connect to the microcontroller MCU in the control circuit 13.

It can be understood that when controlling the first switch, when the charging system 100 detects through the second voltage acquisition circuit 15 that the second voltage is lower than the third preset voltage value, the PWM signal is reduced to decrease the output power; conversely, when the second voltage is higher than the second preset voltage value, the PWM signal is increased to increase the output power. It can be understood that the charging system 100 can make a comprehensive judgment based on the input voltage and output voltage to achieve the adaptive charging function of the charger.

For example, in one embodiment, when it is detected that the second voltage is less than the third preset voltage value and a duration of the second voltage being less than the third preset voltage value reaches a first preset time, the PWM control signal controls the reduction of the switch on time of the first switch within one cycle.

The objective of setting the first preset time mentioned above is to prevent the charger from entering a protection state due to overload during the drop of the second voltage. In other words, the first preset time should be set shorter so that the system can respond quickly to reduce power. For example, the range of the first preset time can be set to 10 ms~500 ms, such as 50 ms, 100 ms, etc.

For example, in one embodiment, when it is detected that the second voltage is higher than the second preset voltage value and a duration of the second voltage being higher than the second preset voltage value reaches a second preset time, the PWM control signal controls the increase of the switch on time of the first switch within one cycle.

The objective of setting the aforementioned second preset time is to determine whether the external charger is in a stable loaded state. Only when it is indeed in a stable state can the power be increased, so the second preset time must be longer than the first preset time. For example, the range of the second preset time can be set to 10 ms-1 s, such as 200 ms, 250 ms, etc.

In addition, considering that when the output voltage of the charging system 100 is relatively low, the power should be increased, but it should also be determined whether the input voltage of the charging system 100 meets the standard. Only when the input voltage is greater than a certain voltage is the power allowed to increase. For example, when it is detected that the first voltage is less than the first preset voltage value, and the second voltage is greater than the second preset voltage value, the control circuit 13 controls the increase of the switch on time of the first switch within one cycle by outputting a PWM control signal.

Further optionally, to ensure the normal operation of the charging system 100, exemplarily, when the second voltage is less than the third preset voltage value, the control circuit 13 can control the reduction of the switch on time of the first switch within one cycle by outputting a PWM control signal to reduce power and allow the second voltage to rise. It should be understood that if the second voltage is less than the third preset voltage value, it indicates an input overload (i.e., charger overload). Therefore, regardless of whether the first voltage and first current meet the first preset voltage and first preset current, the power must be reduced at this time. It can be understood that the third preset voltage value and the second preset voltage value are both set artificially. They can be set equal or unequal. In a preferred solution, there can be a different relationship between the aforementioned third preset voltage value and the second preset voltage value.

As an optional solution, the control circuit 13 can also cyclically control the switch on/off time of the first switch based on the first voltage, the second voltage, and/or the first current, that is, using a combination of the first voltage, the first current, and the second voltage, or one of them to achieve control.

For example, when it is detected that the first voltage is less than the first preset voltage value, the first current is less than the first preset current value, and the second voltage is greater than the second preset voltage value, the control circuit 13 can control the increase of the switch on time of the first switch within one cycle by outputting a PWM control signal. It can be understood that by simultaneously considering the input voltage, the input current, and the output voltage to control the first switch, the charging system can better perform adaptive charging with the external charger, thereby improving the charging efficiency for the energy storage power supply 200 and so on. Conversely, if it is detected that the first voltage is greater than the first preset voltage value, or the first current is greater than the first preset current value, or the second voltage is less than the third preset voltage value, the reduction of the switch on time of the first switch within one cycle can be controlled by the PWM control signal.

Further, if it is detected that the first voltage is equal to the first preset voltage value or the first current is equal to the first preset current value, and the second voltage is greater than the third preset voltage value, the control circuit 13 maintains the PWM control signal of the first switch unchanged. Furthermore, if the second voltage is between the aforementioned second preset voltage value and the third preset voltage value, the first control signal output by the control circuit 13 remains unchanged so as to avoid frequent adjustment of the duty cycle of the first switch, which causes the output to oscillate back and forth. The reason is that, after increasing the power, the voltage immediately drops, the drop leads to a reduction in power, the reduction in power causes the voltage to rise, and the rise in voltage leads to another increase in power.

Preferably, the difference between the third preset voltage value and the second preset voltage value can be greater than 100 mV, such as 300 mV, 500 mV, etc., and can be adaptively set according to actual needs. For example, if the constant voltage input by the external charger is 5V, meaning that the second voltage is 5V, the second preset voltage value can be 4.6V, and the third preset voltage value can be 4.3V; if the second voltage is 9V, the second preset voltage value can be 8.3V, and the third preset voltage value can be 8.0V; and if the second voltage is 12V, the second preset voltage value can be 11.0V, and the third preset voltage value can be 10.5V, etc. It can be understood that the second preset voltage value and the third preset voltage value will change with the variation of the second voltage.

In yet another embodiment, as shown in FIG. 1, the charging system 100 also includes a second current acquisition circuit 17. The second current acquisition circuit 17 is electrically connected to the control circuit 13 and the second end of the second switch, respectively, which is configured to detect the second current output by the charging system 100. The control circuit 13 cyclically controls the switch on/off time of the first switch based on the first voltage and/or the second current. In other words, the control circuit 13 can use one or a combination of the output voltage and the output current of the charging system 100 to control the first switch, thereby controlling the charging system 100 to achieve constant voltage or constant current charging. For example, the second current acquisition circuit 17 can sample signals from the second end (i.e., the output end) of the second switch through two series sampling resistors (not shown in the figure) and transmit them to the control circuit 13 to obtain the second current output by the charging system 100.

For example, in one embodiment, when it is detected that the first voltage is less than the first preset voltage value and the second current is less than the second preset current value, meaning that determining based on the first voltage and the second current, the control circuit 13 controls the increase of the switch on time of the first switch within one cycle by outputting a PWM control signal. That is, when both the output voltage and the output current of the charging system 100 are less than the set value, the control circuit 13 controls to increase the PWM signal to improve the output voltage or output current of the charging system 100. Alternatively, in another embodiment, when it is detected that the second current is greater than the second preset current value, which means that the output current is too large, the control circuit 13 controls to reduce the output current to achieve constant current charging. Furthermore, the control circuit 13 can also control simultaneously based on the first voltage, the second voltage, and the second current to more accurately achieve adaptive charging with the external charger. The values of the second preset current value and the first preset current value are selected according to actual needs and can be equal or unequal. For example, when constant current charging is required, the charging system 100 can determine based on whether the first current reaches the first preset current value or the second current reaches the second preset current value, thereby controlling to enter the constant current working mode.

It can be understood that if the charging system 100 includes the aforementioned second voltage acquisition circuit 15, the first current acquisition circuit 16, and the second current acquisition circuit 17, then when the control circuit 13 controls the switch on time of the first switch within one cycle to be increased, reduced, or maintained, it can combine combinations of at least two of the aforementioned first voltage, the second voltage, the first current, and the second current, which can be set according to actual needs. By comprehensively considering four parameters, the first voltage, the second voltage, the first current, and the second current to make determinations, it can achieve adaptive charging with the external charger and better realize charging management such as input current limitation and output current limitation (for battery safety and lifespan).

In addition, considering the safety issues of the system, in some other embodiments, the charging system 100 also includes corresponding protection circuits, so as to provide charging protection when parameters such as the first voltage, the second voltage, the first current, and/or the second current do not meet the corresponding conditions, such as prohibiting the input and charging of the charging system 100.

Exemplarily, as shown in FIG. 1, the charging system 100 also includes a first protection circuit 18, wherein the first protection circuit 18 is configured to prevent surge voltage effects and can also be configured to prevent electrostatic discharge, etc. Regarding the position of the first protection circuit 18, it can be arranged on the line connected to the input circuit in the charging system 100, and can be arranged after the charging input interface 11, etc., thereby playing a role of surge protection at the moment of connecting to the external charger. For example, the first protection circuit 18 can be implemented using fuses, discharge tubes, etc. As shown in FIG. 2, TVS diodes Z1 and Z2 are configured to provide surge protection at the input end, which instantaneously absorbs surge currents to protect the subsequent circuits.

Further optionally, as shown in FIG. 1, the charging system 100 also includes a second protection circuit 19, wherein the second protection circuit 19 is electrically connected to the charging input interface 11. The second protection circuit 19 is configured to prohibit the charging of the charging system 100 when the second voltage is greater than the fourth preset voltage value and the duration reaches the second preset time, that is, when the input voltage of the charging system 100 exceeds the corresponding preset value and lasts for a period of time. For example, assuming that the second voltage is usually output at 5V, when it is detected that the second voltage is greater than 8V and lasts for 50 ms, the second protection circuit 19 will provide charging protection.

As an alternative solution, the second protection circuit 19 can also cooperate with the control circuit 13 to achieve input protection for the charging system 100. Exemplarily, the second protection circuit 19 is electrically connected to the control circuit 13 and the charging input interface 11, respectively. The control circuit 13 is configured to output a control signal to the second protection circuit 19 when the second voltage is greater than the third preset voltage value and the duration reaches the second preset time. The second protection circuit 19 prohibits the charging of the charging system 100. For example, as shown in FIG. 2, the second protection circuit 19 includes resistors R46, R49, and R50, a zener diode D5, a triode Q3, a MOS transistor Q5, and a capacitor C35, wherein the resistor R46 is connected in parallel with the zener diode D5 and then connected to the power input end DC_IN. The MOS transistor Q5 will be in an off state when the second voltage is greater than 11V, thereby preventing DC_IN from being input through the charging input interface 11.

As another alternative solution, as shown in FIG. 1, the charging system 100 also includes a third protection circuit 20, wherein the third protection circuit 20 is electrically connected to the second end of the second switch. The third protection circuit 20 is configured to control the first voltage to be below the fifth preset voltage value when the first voltage is greater than the fifth preset voltage value and the duration reaches the third preset time. It can be understood that the third protection circuit 20 is configured to achieve output protection for the charging system 100, especially when the output voltage is too high (e.g., exceeding 17V), and needs to be controlled within a safe voltage range. For example, the third protection circuit 20 includes a zener diode.

Figure 9:
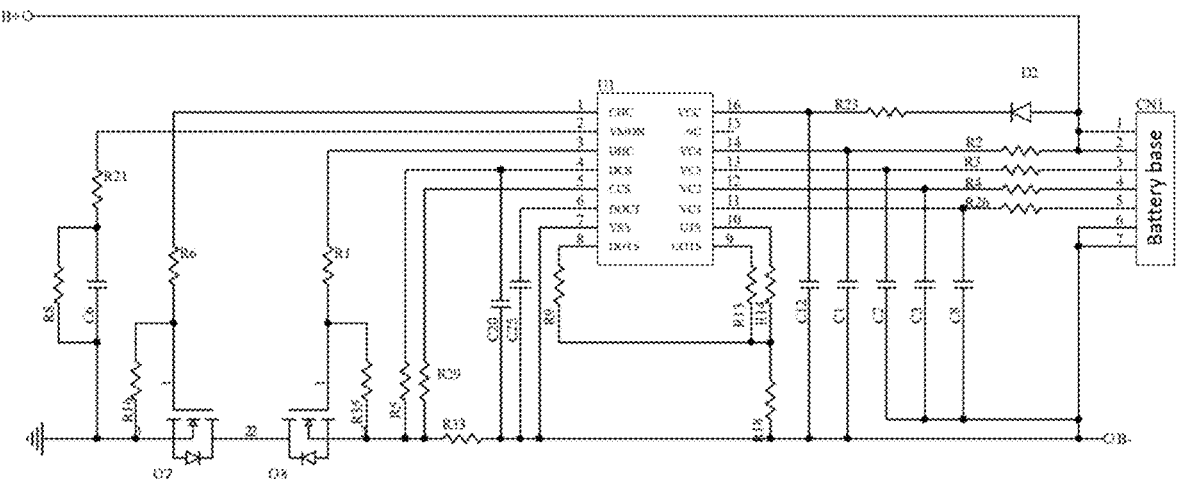
FIG. 9 illustrates a schematic diagram of a structure of a battery protection unit of the charging system according to the embodiments of the present disclosure.

Additionally, as shown in FIG. 1, the charging system 100 also includes a battery protection unit 23, wherein the battery protection unit 23 is electrically connected to the second end of the second switch and is configured to control the reduction of the switch on time of the first switch after the energy storage power supply 200 is fully charged, so as to reduce the output power or stop charging, thereby achieving charging protection. This can improve the service life of the energy storage power supply 200. For example, as shown in FIG. 9, a lithium battery protection unit 23 includes a protection chip Ul specifically configured for lithium batteries or polymer batteries, and its corresponding peripheral devices. It is connected to the battery socket CN1 to achieve charging protection.

As an alternative solution, as shown in FIG. 1, the charging system 100 also includes a temperature sensor 21. The temperature sensor 21 is arranged within a preset distance range of the first switch and/or the inductor. In other words, the temperature sensor 21 is configured to be arranged within a preset distance range of the first switch and/or the inductor so as to detect the temperature of the switch and/or the inductor. It can be understood that by arranging the temperature sensor 21 near the switch transistor and/or the inductor to collect the temperature of the power device, the control circuit 13 will make the charging system 100 stop working when the temperature reaches a preset temperature threshold (e.g., 90° C., 100° C.), thus achieving temperature protection.

As an alternative solution, as shown in FIG. 1, the charging system 100 also includes a charging status indication circuit 22, which is configured to indicate the power value of the energy storage power supply 200, charging status (such as in charging, charging completed), and related parameters (such as the first voltage, the second voltage, the first current, the second current, temperature value), etc. For example, the charging status indication circuit 22 may be achieved by using Light Emitting Diode (LED) lights, digital tubes, and Liquid Crystal Display (LCD) screens can be used to achieve this.

The charging system 100 provided in the present disclosure adjusts the charging power by combining a range of variations in at least one of the output voltage and output current, the input voltage, the input current, and the like, to achieve the self-adaptation of various chargers with different power. Moreover, the charging input interface 11 is provided with three pins, including an enable signal pin, which can activate special functions such as fast charging and is compatible with different types of chargers, such as PD chargers and fast chargers, thus achieving maximum compatibility with various charger specifications, improving charging efficiency, and saving energy.

Figure 10:
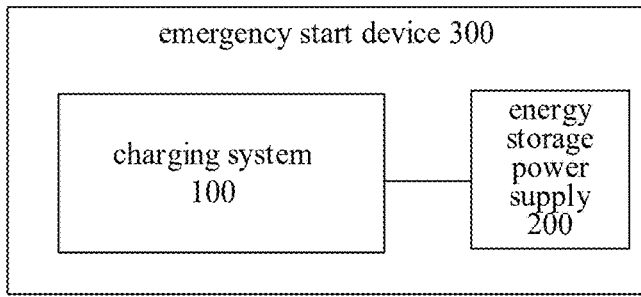
FIG. 10 illustrates a schematic diagram of a structure of an emergency start device according to the embodiments of the present disclosure.

In addition, the present disclosure also provides an emergency start device 300. Exemplarily, as shown in FIG. 10, the emergency start device 300 includes the aforementioned charging system 100 and a built-in energy storage power supply 200, wherein the second end of the second switch is electrically connected to the built-in energy storage power supply 200. It can be understood that the options mentioned in the aforementioned charging system 100 are also applicable to the embodiment, and will not be described here again.

In the several embodiments provided in the present disclosure, it should be understood that the devices and methods disclosed can be implemented in other ways. The device embodiments described above are merely illustrative. For example, the flowcharts and structure diagrams in the drawings illustrate possible implementations, architectures, functions, and operations of devices, methods, and computer program products according to multiple embodiments of the present disclosure. At this point, each box in the flowchart or diagram can represent a module, program segment, or part of the code. Each part of the module, program segment, or code includes one or more executable instructions for implementing the specified logical functions. It should also be noted that in the implementation as a replacement, the functions indicated in the boxes may occur in a different order than those indicated in the drawings. For example, two consecutive boxes can actually be executed in parallel, and sometimes they can also be executed in reverse order, depending on the functionality involved. It should also be noted that each box in the structure diagram and/or flowchart, and the combination of boxes in the structure diagram and/or flowchart, can be implemented by specialized hardware-based systems designed to perform the specified functions or actions, or by a combination of specialized hardware and computer instructions.

Further, each functional module or unit in each embodiment of the present disclosure can be integrated together to form a separate part, or each module may exist separately, or two or more modules may be integrated to form a separate part.

The functionality, when implemented as a software functional module and sold or used as a stand-alone product, can be stored in a computer-readable storage medium. Based on this understanding, the technical solution of the present disclosure can essentially be embodied in the form of a software product, which contributes to or includes parts of the prior art. The software product is stored in a storage medium and includes multiple instructions for causing a computer device (which can be a smartphone, a personal computer, a server, a network device, etc.) to execute all or some of the steps of the methods described in various embodiments of the present disclosure. The aforementioned storage media include various media that can store program code, such as USB drives, external hard drives, read-only memory (ROM), random access memory (RAM), disks, or optical discs.

The above is only a specific embodiment of the present disclosure, but the scope of protection of the present disclosure is not limited thereto. Any person skilled in the art can easily envisage changes or substitutions within the technical scope disclosed in the present disclosure, which should be encompassed within the scope of protection of the present disclosure.

What is claimed is:

1. A charging system, configured for charging an energy storage power supply, wherein the charging system comprises a charging input interface, an inductor, a first switch, a second switch, a first voltage acquisition circuit, a second voltage acquisition circuit and a control circuit;

the charging input interface is electrically connected to a first end of the inductor;

a second end of the inductor is electrically connected to a first end of the first switch and a first end of the second switch respectively;

a second end of the first switch is electrically connected to a ground terminal, and a second end of the second switch is configured for electrical connection with the energy storage power supply;

the first voltage acquisition circuit is electrically connected to the second end of the second switch and is configured to detect a first voltage output by the charging system in real time;

the control circuit is electrically connected to the first voltage acquisition circuit and a control terminal of the first switch respectively, and the control circuit cyclically controls a switch on/off time of the first switch based on the first voltage;

during a charging process of the charging system, when the first voltage is less than a first preset voltage value, the control circuit controls the first switch to conduct and starts cyclic control; when the first switch is in a switch-on state, the second switch is in a switch off state; and when the first switch is in a switch-off state, the second switch is in a switch-on state;

the control circuit outputs a Pulse Width Modulation (PWM) control signal to the first switch;

the second voltage acquisition circuit is electrically connected to the control circuit and the charging input interface respectively and is configured to detect a second voltage input by the charging input interface; and the control circuit cyclically controls the switch on/off time of the first switch based on the first voltage and/or the second voltage; and when the first voltage is less than the first preset voltage value and the second voltage is greater than a second preset voltage value, the PWM control signal controls an increase of the switch on time of the first switch within one cycle.

2. The charging system according to claim 1, wherein the first switch is a Metal Oxide Semiconductor (MOS) transistor, the second switch is a diode, the first end of the second switch is an anode of the diode, and the second end of the second switch is a cathode of the diode.

3. The charging system according to claim 1, wherein the first switch is a MOS transistor, the second switch is a MOS transistor, and a control terminal of the second switch is connected to the control circuit.

4. The charging system according to claim 1, wherein the charging system further comprises a first capacitor, one end of the first capacitor is electrically connected to the second end of the second switch, and the other end of the first capacitor is electrically connected to the ground terminal.

5. The charging system according to claim 1, wherein the charging input interface is a universal serial bus connector.

6. The charging system according to claim 5, wherein the charging input interface comprises a first pin, a second pin, and a third pin; the first pin is a positive terminal, the second pin is a negative terminal, and the third pin is a signal terminal; and the third pin is configured to communicate with an external charger.

7. The charging system according to claim 6, wherein the charging system comprises a protocol chip, and the protocol chip is electrically connected to the third pin.

8. The charging system according to claim 7, wherein the protocol chip controls a voltage value between the first pin and the second pin to be between 3.3V and 28V.

9. The charging system according to claim 6, wherein the control circuit is a microprocessor, and the third pin is electrically connected to the control circuit.

10. The charging system according to claim 1, wherein the charging system further comprises a first current acquisition circuit; the first current acquisition circuit is electrically connected to the control circuit and the charging input interface respectively and is configured to detect a first current input by the charging input interface; and the control circuit cyclically controls the switch on/off time of the first switch based on the first voltage and/or the first current.

11. The charging system according to claim 10, wherein when the first voltage is less than the first preset voltage value and the first current is less than a first preset current value, the PWM control signal controls an increase of the switch on time of the first switch within one cycle.

12. The charging system according to claim 10, wherein the first voltage is greater than the first preset voltage value, or the first current is greater than the first preset current value, the PWM control signal controls a reduction of the switch on time of the first switch within one cycle.

13. The charging system according to claim 1, wherein when the first voltage is greater than the first preset voltage value, or the second voltage is less than a third preset voltage value, the PWM control signal controls a reduction of the switch on time of the first switch within one cycle.

14. The charging system according to claim 1, wherein when the second voltage is less than a third preset voltage value and a duration of the second voltage being less than the third preset value reaches a first preset time, the PWM control signal controls a reduction of the switch on time of the first switch within one cycle.

15. The charging system according to claim 1, wherein the charging system further comprises a second current acquisition circuit; the second current acquisition circuit is electrically connected to the control circuit and the second end of the second switch respectively and is configured to detect a second current input by the charging system; and the control circuit cyclically controls the switch on/off time of the first switch based on the first voltage and/or the second current.

16. The charging system according to claim 15, wherein when the first voltage is less than the first preset voltage value and the second current is less than a second preset current value, the PWM control signal controls an increase of the switch on time of the first switch within one cycle.

17. The charging system according to claim 1, wherein the charging system further comprises a first protection circuit, and the first protection circuit is configured to prevent electrostatic discharge and/or surge voltage.

18. The charging system according to claim 17, wherein the charging system further comprises a second protection circuit, and the second protection circuit is electrically connected to the charging input interface and is configured to prohibit a charging of the charging system when a second voltage input by the charging input interface is greater than a fourth preset voltage value, and a duration of the second voltage being greater than the fourth preset voltage value reaches a second preset time.

19. The charging system according to claim 17, wherein the charging system further comprises a second protection circuit; the second protection circuit is electrically connected to the control circuit and the charging input interface respectively; and the control circuit is configured to output a control signal to the second protection circuit when a second voltage input by the charging input interface is greater than a fourth preset voltage value, and a duration of the second voltage being greater than the fourth preset voltage value reaches a second preset time, such that the second protection circuit prohibits a charging of the charging system.

20. The charging system according to claim 19, wherein the charging system further comprises a third protection circuit, and the third protection circuit is electrically connected to the second end of the second switch and is configured to control the first voltage to be below a fifth preset voltage value when the first voltage is greater than the fifth preset voltage value, and a duration of the first voltage being greater than the fifth preset voltage value reaches a third preset time.

* * * * *